US008239670B1

(12) United States Patent
Kaufman et al.

(10) Patent No.: US 8,239,670 B1
(45) Date of Patent: Aug. 7, 2012

(54) MULTI-ASPECT IDENTIFIER IN NETWORK PROTOCOL HANDSHAKE

(75) Inventors: Matthew Kaufman, Bonny Doon, CA (US); Michael Thornburgh, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 731 days.

(21) Appl. No.: 12/120,221

(22) Filed: May 13, 2008

(51) Int. Cl.
*H06F 15/16* (2006.01)
(52) U.S. Cl. .............. 713/151; 726/7; 726/12; 713/171; 713/401; 713/168; 713/150; 380/55; 380/281; 380/277
(58) Field of Classification Search .................. 709/237; 726/14, 15; 713/151, 169
See application file for complete search history.

(56) References Cited

U.S. PATENT DOCUMENTS

| | | | | |
|---|---|---|---|---|
| 6,108,783 | A * | 8/2000 | Krawczyk et al. | 713/180 |
| 6,931,528 | B1 * | 8/2005 | Immonen | 713/151 |
| 7,653,938 | B1 * | 1/2010 | Touitou et al. | 726/14 |
| 2003/0135625 | A1 * | 7/2003 | Fontes et al. | 709/228 |
| 2003/0163697 | A1 * | 8/2003 | Pabla et al. | 713/171 |
| 2005/0050004 | A1 * | 3/2005 | Sheu et al. | 707/1 |
| 2005/0240762 | A1 * | 10/2005 | Mao | 713/168 |
| 2006/0047839 | A1 * | 3/2006 | Tate et al. | 709/230 |
| 2007/0097934 | A1 * | 5/2007 | Walker et al. | 370/338 |
| 2007/0136800 | A1 * | 6/2007 | Chan et al. | 726/10 |
| 2008/0222304 | A1 * | 9/2008 | Sibal et al. | 709/238 |
| 2009/0132714 | A1 * | 5/2009 | Blander et al. | 709/227 |

OTHER PUBLICATIONS

"Beyond Secret Handshakes: Affiliation-Hiding Authenticated Key Exchange"—Stanislaw Jarecki, Jihye Kim, Gene Tsudik published by UC Irvine, Computer Science Department, Mar. 2008 http://www.ics.uci.edu/~gts/paps/jkt08.pdf.*
"CHAP (Challenge Handshake Authentication Protocol"—DAX networks, May 2006 http://www.daxnetworks.com/Technology/TechDost/TD-061406.pdf.*
Andreasson, "Chapter 4.4. TCP Connections", 2001, Downloaded from the internet at http://www.faqs.org/docs/iptables/tcpconnections.html on May 9, 2008, 4 pages.
Bernstein, "SYN Cookies", downloaded from the internet at http://cr.yp.to/syncookies.html, on May 9, 2008, 3 pages.
Federal Information Processing Standards "Secure Hash Standard" Publication 180-2, Aug. 1, 2002, 74 pages.
Kaufman, et al. "The Secure Media Flow Protocol—Version 1" Amicima, Inc., 2004, downloaded from the internet at , http://web.archive.org/web/20060211083929/www.amicima.com/downloads/documentation/proto1-doc-20051216.txt on Apr. 10, 2007, 14 pages.
Stewart "Stream Control Transmission Protocol", Network Working Group, Request for Comment 4960, Sep. 2007, downloaded from the internet at http://www.ietf.org/rfc/rfc4960.txt on May 9, 2008, 150 pages.

* cited by examiner

*Primary Examiner* — Krista Zele
*Assistant Examiner* — Randy Scott
(74) *Attorney, Agent, or Firm* — Fish & Richardson P.C.

(57) ABSTRACT

This specification describes technologies relating to a multi-aspect identifier used in a network protocol handshake for establishing a network connection, while providing protection against denial of service attacks. For example, an employed cookie format can be enhanced to contain multiple parts so that cookies that would otherwise be valid if the source address matched can be distinguished from those that are entirely incorrect, and a message can be sent with a replacement cookie in such cases, without generating state at the responding node.

16 Claims, 4 Drawing Sheets

MULTI-ASPECT IDENTIFIER IN NETWORK PROTOCOL HANDSHAKE

BACKGROUND

The present disclosure relates to network protocol handshakes used to establish network connections, while providing protection against denial of service attacks.

Network protocol handshakes have been modified to help prevent denial of service attacks. Typically, the initiator sends an initial request in the handshake, such as a synchronization (SYN) packet in TCP/IP (Transmission Control Protocol over Internet Protocol), and the responder sends back a cookie, which is a piece of data (e.g., text data) stored at the initiator and used to maintain information. The cookie is generated such that the responder need not maintain per-initiator state (e.g., allocation of resources such as memory) after responding to the initial request. The cookie is typically generated by combining information such as the approximate current time (e.g., to the nearest minute), a secret known only to the responder, and the IP address from which the initial request came, and then protecting it using a one way hash function.

The initiator receives the cookie and sends it back with the next part of the handshake. This can protect against several forms of denial-of-service attack, such as sending large numbers of startup messages (which create state in the receiver) from forged source addresses, or sending more startup messages than the attacker has the capacity to actually receive and process.

SUMMARY

This specification describes technologies relating to a multi-aspect identifier used in a network protocol handshake for establishing a network connection, while providing protection against denial of service attacks. For example, an employed cookie format can be enhanced to contain multiple parts so that cookies that would otherwise be valid if the source address matched can be distinguished from those that are entirely incorrect, and a message can be sent with a replacement cookie in such cases, without generating state at the responding node.

In general, one aspect of the subject matter described in this specification can be embodied in a method that includes receiving a first message, in a network protocol connection establishment handshake, from an initiator, the first message including source information indicating a source of the first message; generating a transaction identifier using private information and the source information indicating the source of the first message, the transaction identifier including a first aspect and a second aspect; sending a second message, in the network protocol connection establishment handshake, to the initiator, the second message including the transaction identifier; receiving a third message, in the network protocol connection establishment handshake, from the initiator, the third message including the transaction identifier and source information indicating a source of the third message; terminating the network protocol connection establishment handshake when the first aspect of the transaction identifier does not match a first expectation that is independent of the source information indicating the source of the first message matching the source information indicating the source of the third message; establishing a connection with the initiator when the first aspect of the transaction identifier matches the first expectation, and the second aspect of the transaction identifier matches a second expectation that is dependent on the source information indicating the source of the first message matching the source information indicating the source of the third message; and continuing the network protocol connection establishment handshake to establish the connection when the first aspect of the transaction identifier matches the first expectation, but the second aspect of the transaction identifier does not match the second expectation. Other embodiments of this aspect include corresponding systems, apparatus, and computer program products.

These and other embodiments can optionally include one or more of the following features. Receiving the first message can include receiving the first message either directly from the initiator or indirectly from the initiator through an intermediary. Continuing the network protocol connection establishment handshake can include: generating a new identifier using private information and the source information indicating the source of the third message; and sending a fourth message, including the new identifier, to the initiator to cause the initiator to resend the third message using the new identifier.

Generating the transaction identifier can include: applying a trapdoor function to first input to create a first data portion; applying a trapdoor function to second input to create a second data portion, the second input including the source information indicating the source of the first message; and combining the first and second data portions into a cookie including the transaction identifier. The private information can include a secret key, and applying the trapdoor function to the second input can include applying a cryptographic hash function to the second input using the secret key, wherein the second input further includes current time information, and the source of the first message includes a network address.

Particular embodiments of the subject matter described in this specification can be implemented to realize one or more of the following advantages. Denial-of-service-attacks protection need not be degraded in order to accommodate certain network configurations; connections can succeed where they might previously have failed in certain network configurations. The techniques described can be of particular use in peer-to-peer networks, where a third party introduction used for network address translation (NAT) traversal can interfere with traditional handshake methods for providing denial-of-service-attacks protection.

When an initiator has multiple network addresses (e.g., by having multiple network interfaces, or by having multiple addresses per interface, such as in deployments of Internet Protocol Version 6 (IPv6), or both) the subject matter described in this specification can result in an improved connection establishment handshake. One of these network addresses may be preferred when sending the first message of the handshake, which elicits a cookie, and a second of these network addresses may be preferred when sending subsequent messages that include the cookie. The reason for preferring different interfaces for the first and second messages can include the responder being reachable via a plurality of addresses for various reasons (e.g., the responder can have multiple network addresses as well), and its preference for sending messages via an address different from the address to which an original message was directed. Nonetheless, the presently described network protocol connection establishment handshake can accommodate such network configurations and decrease the overall time needed to form the connection.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
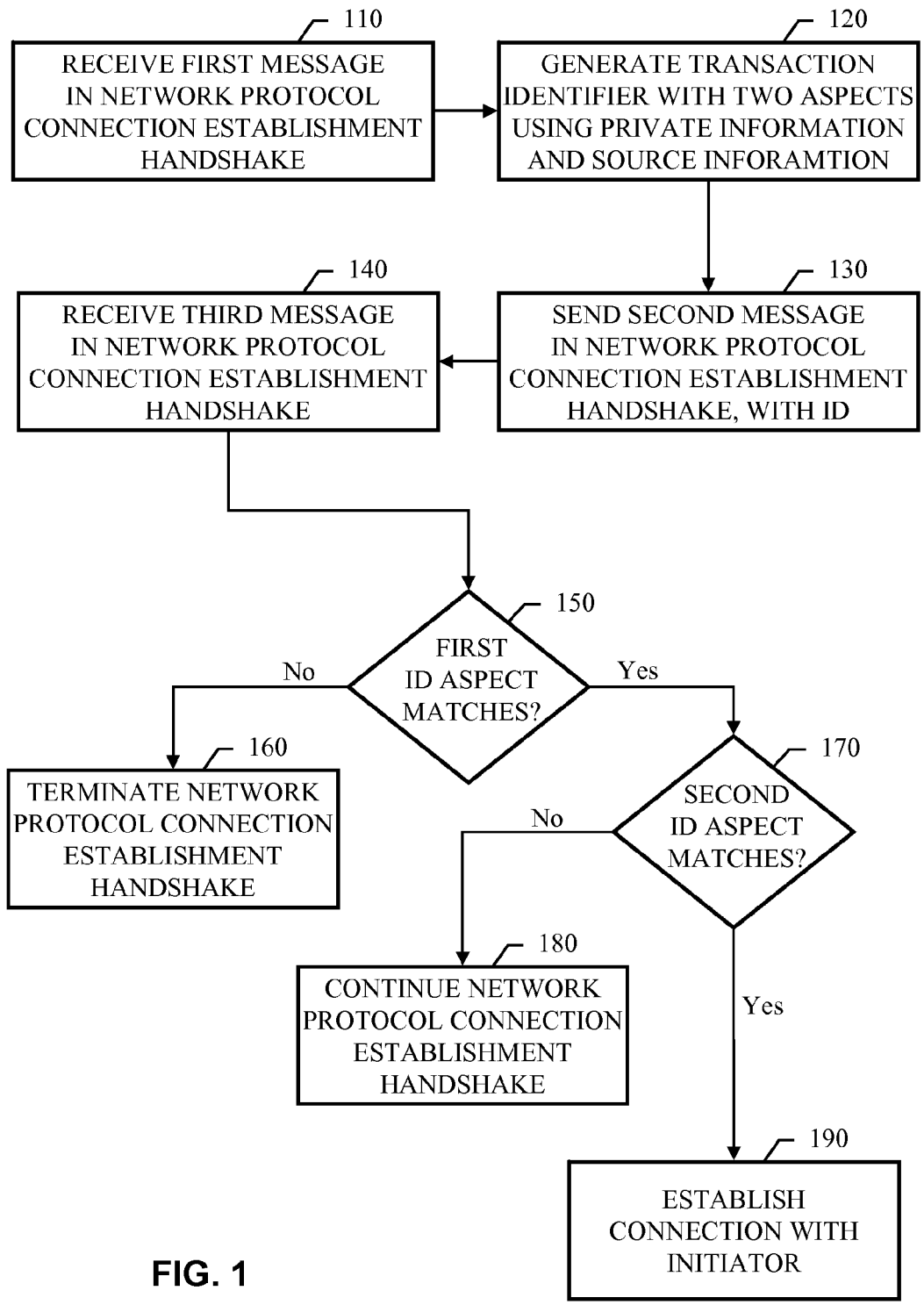
FIG. 1 shows an example process of using a multi-aspect identifier in a network protocol connection establishment handshake.

FIG. 1 shows an example process of using a multi-aspect identifier in a network protocol connection establishment handshake. A first message in a network protocol connection establishment handshake is received 110 from an initiator. The first message includes source information indicating a source of the first message. However, this source information can appear in different places within the message. For example, the first message can be received indirectly from the initiator through an intermediary, where the source information corresponding to the initiator is included within a payload or other field of the first message.

Figure 2:
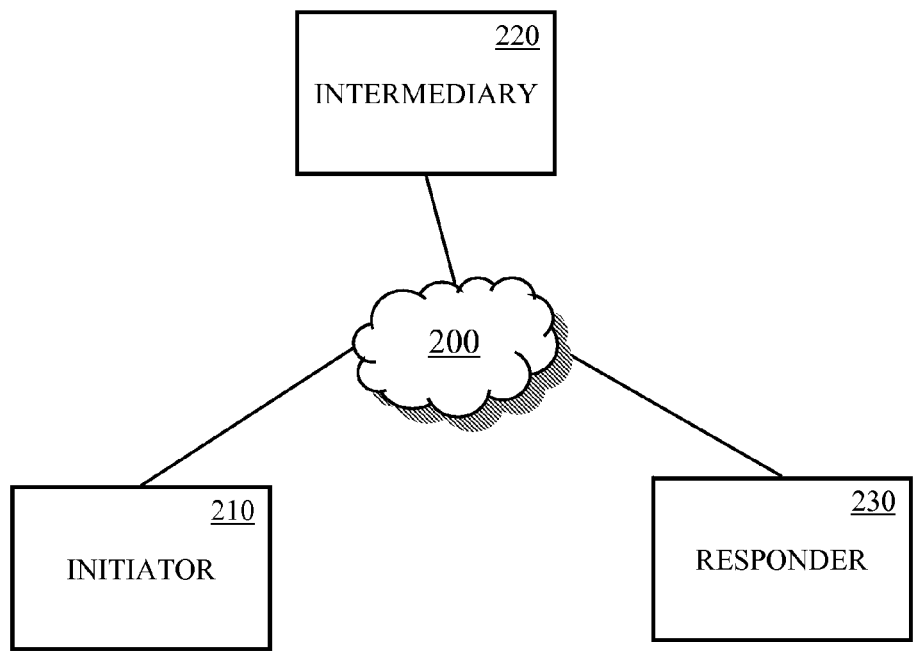
FIG. 2 shows an example system in which a network protocol connection establishment handshake is employed.

FIG. 2 shows an example system in which a network protocol connection establishment handshake is employed. A network 200 provides communications paths through which multiple nodes can exchange information and interact with each other. The communications network 200 can be a single network (e.g., a local area network), an inter-network (e.g., the Internet), or a virtual network (e.g., a Virtual Private Network (VPN) run over the Internet).

The nodes can include an initiator 210, an intermediary 220, and a responder 230. Each node connected to the network 200 is an entity, such as a hardware device or software hosted on a hardware device, that is capable of transmitting and receiving information over data transmission media. A node can include, but is not limited to, a client or a server hosted on a computing platform in a client-server environment, or a peer in a peer-to-peer network. Examples of computing platforms include personal computers, laptop computers, mobile telephones, personal digital assistants, among others. A node can be hosted on its own associated computing platform, which is distinct from computing platforms hosting other nodes, but each computing platform can also host multiple nodes.

Each node can include one or more processes that are communicatively coupled to the network 200 through a communication adapter (not shown) associated with a particular computing platform. Examples of node processes include, but are not limited to, e-mail applications, web browsers, document processing programs and media players. Examples of servers include web servers, print servers, e-mail servers, multimedia content servers adapted to distribute audio or video content, and/or the FLASH® Media Server provide by Adobe Systems Incorporated of San Jose, Calif., among others.

To communicate and exchange information between the initiator 210 and the responder 230, a connection between the initiator 210 and the responder 230 is established using a network protocol handshake. Examples of such handshakes include the synchronization and acknowledgement packets employed in TCP/IP connection establishment, and the Initiator and Responder Hello messages employed in the Secure Media Flow Protocol (MFP). Moreover, a connection can be established between two nodes over various other communication protocols including, for example, connection oriented protocols such as TCP/IP, or connectionless network protocols such as UDP/IP (User Datagram Protocol over Internet Protocol).

The initiator 210 can send a first message in a network protocol connection establishment handshake to the responder 230, in which case, the responder 230 can receive the first message directly from the initiator 210 (irrespective of any intermediate nodes that forward the message). Alternatively, the initiator 210 can send the first message to the intermediary 220, which can in turn redirect the first message to the responder 230 when the intermediary 220 has information indicating that the responder 230 is an appropriate recipient for the message. For example, in a peer-to-peer network using NAT traversal, the first message might be relayed by a third party. Note that the redirected message can be provided in the form of a new message (e.g., a new packet generated at the intermediary 220), where the source information for the initiator 210 is included within the payload or other field of the new message. In such case, the new message is still considered as being the first message from the initiator 210 for purposes of this disclosure, and the identifier is generated using the source information (e.g., IP address) seen by the relaying/introducing node. Thus, the responder 230 can receive the first message indirectly from the initiator 210 through the intermediary 220, and also identify in the first message source information that corresponds to the initiator 210.

Therefore, regardless of whether the first message is received directly or indirectly from the initiator, a transaction identifier can be generated 120 using private information (e.g., a secret key retained at the responder 230) and the source information indicating the source of the first message. The transaction identifier includes a first aspect, which can be independent of the source information indicating the source of the first message, and a second aspect, which is dependent upon the source information indicating the source of the first message. Further details regarding examples of such identifier generation are described below in connection with FIGS. 6 and 7.

A second message, in the network protocol connection establishment handshake, is then sent 130 to the initiator, where the second message includes the transaction identifier. This transaction identifier can be received by the initiator and returned in the third message in the network protocol connection establishment handshake. The third message is received 140 from the initiator, and the third message includes the transaction identifier and source information indicating a source of the third message.

Figure 3:
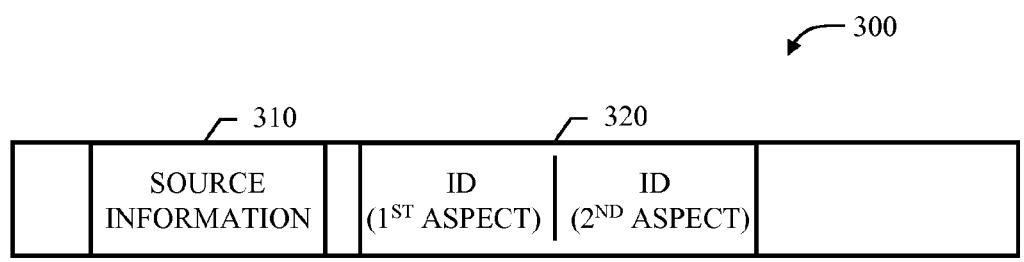
FIG. 3 shows an example message in a network protocol connection establishment handshake.

FIG. 3 shows an example message 300 in a network protocol connection establishment handshake. The message 300 includes source information 310 that corresponds to the source of the message (e.g., an IP address of the initiator 210). In the case of the first message, as noted above, the source information 310 may be included in the payload or other field of the message 300, rather than in a source field of the message 300, depending on whether the message is received indirectly or directly from the initiator.

In the case of the third message, the source information 310 is included in the source field of the message 300. In addition, the third message 300 includes a transaction identifier 320, which has a first aspect that can be independent of the source information indicating the source of the first message, and a second aspect that is dependent upon the source information indicating the source of the first message. Note that the source information 310, which indicates the source of the third message, may not match the source information that indicates the source of the first message. For example, the initiator 210 can have multiple IP addresses, where a first of these addresses is included in the first message, and a second of these addresses is included in the third message. Further details regarding an example of such a situation is described below in connection with FIG. 5.

Once the third message is received, the first aspect and the second aspect of the transaction identifier can be checked against expectations for the transaction identifier. Such checks can be performed in parallel or in series. For example, a check can be made 150 to see if the first aspect matches a first expectation that is independent of the source information indicating the source of the first message matching the source information indicating the source of the third message. The first expectation does not depend on the source information matching for the first and third messages. The first aspect of the transaction identifier can be recreated based on the relevant inputs (excluding the source information indicating the source of the third message, but possibly including inputs found in the transaction identifier itself) and then compared with the first aspect of the transaction identifier provided in the third message.

If the first aspect does not match, the network protocol connection establishment handshake can be terminated 160. It should be noted that, in some implementations, the second aspect of the identifier need not be checked when the first aspect does not match, since failure to match the first aspect can automatically mean that the second aspect will not match. In general, the network protocol connection establishment handshake can be terminated when neither the first aspect nor the second aspect of the transaction identifier match the expectations for them.

When the first aspect matches, a check can be made 170 to see if the second aspect matches a second expectation that is dependent on the source information indicating the source of the first message matching the source information indicating the source of the third message. The second expectation depends on the source information matching for the first and third messages. The second aspect of the transaction identifier can be recreated based on the relevant inputs and then compared with the second aspect of the transaction identifier provided in the third message. If both the first aspect and the second aspect of the transaction identifier match the expectations for them, a connection can then be established 190 with the initiator.

If the first aspect of the transaction identifier matches, but the second aspect of the transaction identifier does not, the network protocol connection establishment handshake nonetheless continues 180 in order to establish the connection, if possible. Thus, when the source information indicating the source of the third message is not the same as the source information indicating the source of the first message, the handshake does not need to be terminated, but rather can proceed to a new stage in an attempt to allow the connection establishment to still be completed.

Figure 4:
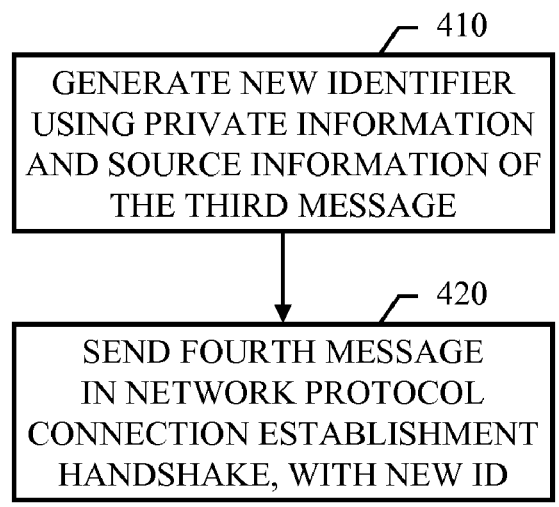
FIG. 4 shows an example process of continuing a network protocol connection establishment handshake when a multi-aspect identifier only partially matches expectations.

FIG. 4 shows an example process of continuing a network protocol connection establishment handshake when a multi-aspect identifier only partially matches expectations. A new identifier can be generated 410 using private information and the source information indicating the source of the third message. The private information can be the same as that used in the initial transaction identifier generation, or it can be different. Then, a fourth message can be sent 420 to the initiator, where the fourth message includes the new identifier and causes the initiator to resend the third message using the new identifier.

Figure 5:
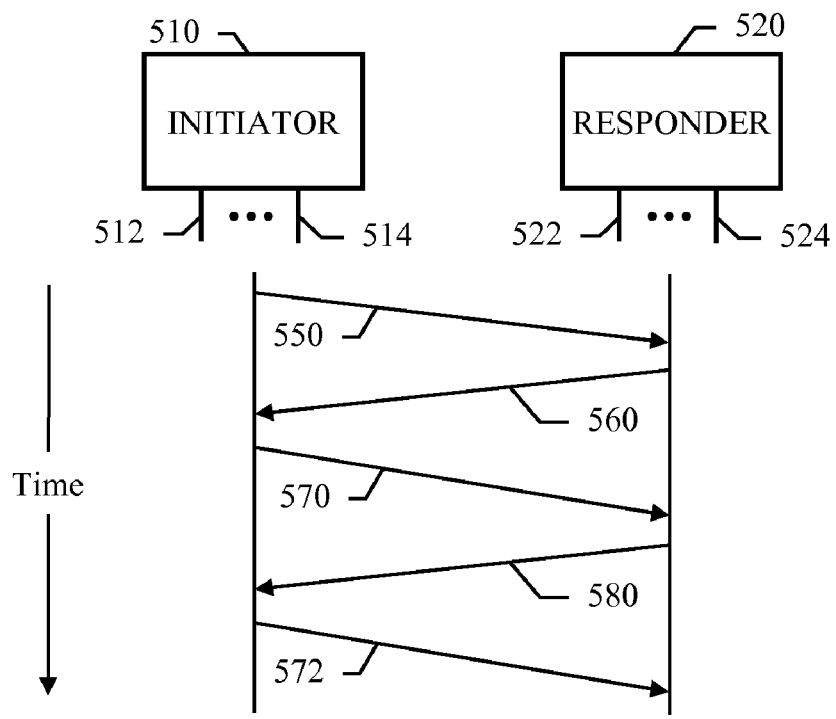
FIG. 5 shows another example system in which a network protocol connection establishment handshake is employed.

FIG. 5 shows another example system in which a network protocol connection establishment handshake is employed. An initiator 510 can be multi-homed in that it can have multiple network connection points 512, 514 (e.g., multiple IP addresses, including potentially one or more IP V6 addresses). These connection points 512, 514 can correspond to multiple physical links (which can be connected to separate networks, such as a wired network and a wireless network), or these connection points 512, 514 can correspond to different logical links that operate over a single physical link. Likewise, a responder 520 can be multi-homed in that it can also have multiple network connection points 522, 524 (e.g., multiple IP addresses, including potentially one or more IP V6 addresses). These connection points 522, 524 can correspond to multiple physical links (which can be connected to separate networks), or these connection points 522, 524 can correspond to different logical links that operate over a single physical link.

The initiator 510 can send a first message 550 that originates from a first connection point 512, and the responder 520 can send back a second message 560. The second message 560 can include a transaction identifier (ID), such as described above. For example, the second message 560 can include a cookie having a multi-aspect ID, where a first aspect of the ID is independent of the connection point 512, and a second aspect of the ID is dependent on the connection point 512. Note that the responder need not retain any state information regarding the received first message 550 after the second message 560 has been sent.

The initiator 510 can then send a third message 570 back to the responder 520, where the third message 570 originates from a second connection point 514. Thus, for example, the source address seen in the "cookie response" does not match the source address used when the cookie was first generated. This can happen in a number of different scenarios. For example, a peer using a NAT traversal introducer can have multiple network interfaces and may find that the best route to the responder is through a different interface than that used when the first message 550 was sent to the introducer. In a traditional handshake including a cookie response, if this were the case, the connection would not be able to come up because of the IP address mismatch with the cookie.

However, because the third message 570 includes the multi-aspect ID, a mismatch between source addresses need not result in termination of the handshake. The multi-aspect ID can be made up of several parts that can be individually inspected, rather than a single hash of a single concatenation. Thus, the cookie response can be examined to determine whether it would in fact have contained a valid cookie if the source address for the third message 570 matched the encoded information in the cookie.

Upon receipt of a partially valid multi-aspect ID, an ID change message 580 can be generated and sent to the initiator 510. Again, once this fourth message has been sent, the responder need not retain any state information regarding the handshake. The ID change message 580 contains a new ID, which matches the second connection point 514 (e.g., the newly seen source IP address). This new ID can be another multi-aspect ID or a traditional single-aspect ID. In response to the ID change message 580, the initiator 510 can then send a new third message 572, which includes the revised ID.

Note that if one or more additional ID change messages are received within the context of the connection being established, the initiator 510 can be programmed to ignore any ID change messages over a pre-defined limit (e.g., the limit can be set to one ID change message per connection attempt). Other appropriate limitations on, or exceptions to, when an ID change message will be honored by the initiator 510 can also be implemented, depending on the implementation context. For example, more than one ID change message can be honored when other information indicates that multiple ID changes may be appropriate (e.g., when the initiator 510 can actually have its address change during startup of the connection, such as by moving from one network to another).

Figure 6:
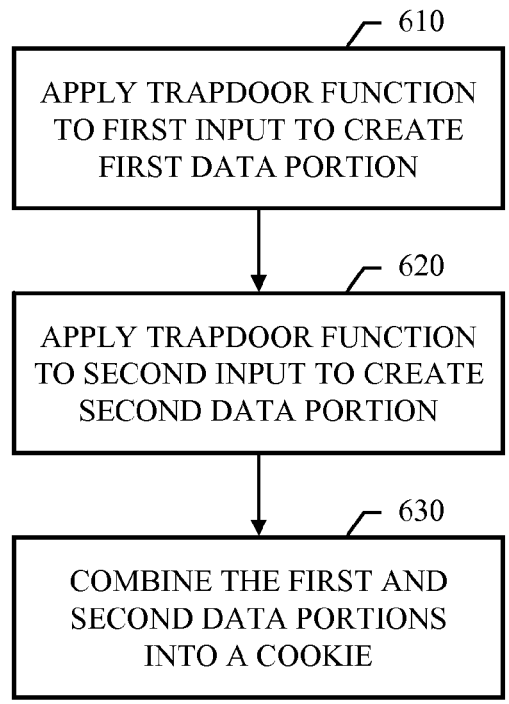
FIG. 6 shows an example process of generating a transaction identifier.

FIG. 6 shows an example process of generating a transaction identifier. A trapdoor function can be applied 610 to first input to create a first data portion. A trapdoor function is a function that is easy to compute in one direction, yet believed to be difficult to compute in the opposite direction (finding its inverse) without special information, called the "trapdoor". For example, the trapdoor function can be a cryptographic hash function, such as described below in connection with FIG. 7.

A trapdoor function can be applied 620 to second input to create a second data portion, where the second input includes the source information indicating the source of the message. The trapdoor function applied to the second input can be same, or different than, the trapdoor function applied to the first input. In any event, the first and second data portions can be combined 630 into a multi-aspect identifier in a cookie.

The cookie can be just the multi-aspect ID, or the cookie can include other data in addition to the multi-aspect ID. Moreover, the combination of the first and second data portions can take many forms. For example, the first and second data portions can be placed in separate locations within the cookie. These separate locations can have other data field(s) placed there between, or these separate locations can abut each other; thus, the first and second data portions can be concatenated to form the multi-aspect identifier that is placed in the cookie.

Alternatively, the first and second data portions can be convolved in some fashion to form the multi-aspect ID. For example, the two data portions can be interleaved, such as by alternating one bit from each throughout the ID field. Moreover, the first and second aspects of the multi-aspect ID can be convolved in some fashion, such as by using data of the second aspect as input to the generation of the first aspect. For example, the ID can include the source information (e.g., IP address) indicating the source of the first message, plus a hash of that source information, where the first aspect is the hash, and the second aspect is the hash plus the source information itself. In this case, both the first and second aspects are dependent on the source information indicating the source of the first message, but the expectation for the first aspect is that the hash is correct for the source information indicating the source of the first message, and the expectation for the second aspect is that the hash is correct for the source information indicating the source of the first message and that this source information matches the source information indicating the source of the third message.

As another, related example, the multi-aspect ID can include three portions: a first portion being an encoded representation of the time and a random salt, a second portion being an encoded representation of the initiator's address as originally provided, and a third portion being a hash covering the first and second portions combined with non-disclosed secret data retained by the responder. Checking the first aspect can include verifying that the time falls within an acceptable window and that the hash covering the first and second portions, keyed with the secret data, matches. Verifying the second aspect can include verifying the first aspect and verifying that the encoded address matches the address from which the current message was received.

Figure 7:
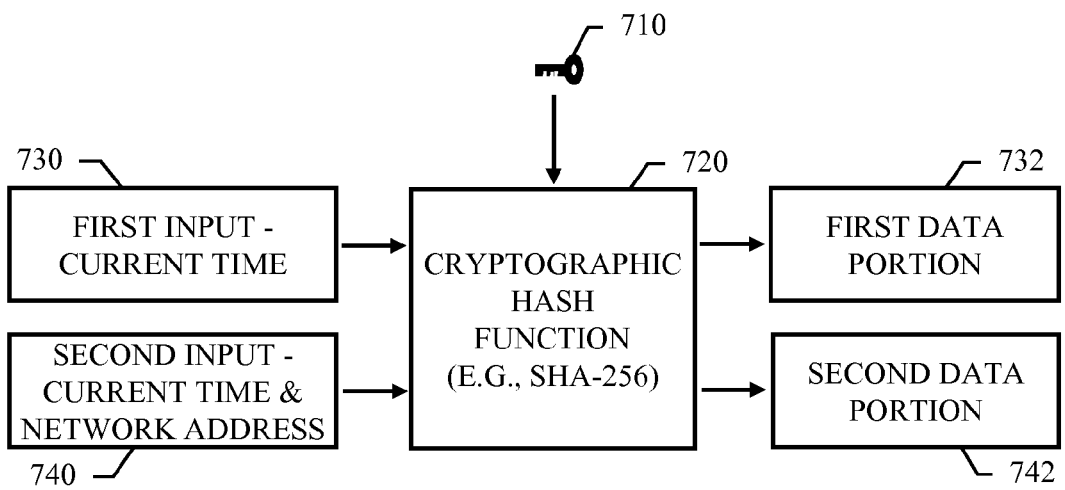
FIG. 7 shows another example process of generating a transaction identifier.

FIG. 7 shows another example process of generating a transaction identifier. The private information can include a secret key 710, which can be used with a cryptographic hash function 720 (e.g., the Federal Information Processing Standard 180-2 "Secure Hash Standard" SHA-256). The hash function 720 can be used to process first information 730 to produce a first data portion 732, and the hash function 720 can be used to process second information 740 to produce a second data portion 742. The first information 730 can include a quantized value of the current time (e.g., to the nearest minute). The second information 740 can include a quantized value of the current time (e.g., to the nearest minute) and a network address (e.g., an IP address) for the message. Other inputs are also possible. For example, the information combined to produce the second data portion 742 can include the time quantized to the nearest seventy five second period from the start of the process, an encoding of the socket address (e.g., combination of IP address and UDP port number), and the process' random secret key. During verification, the current seventy five second period and the previous seventy five second period can be allowed to match, which gives an "allowed" window of no more than one hundred and fifty seconds.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving a first message, in a network protocol connection establishment handshake, from an initiator, the first message comprising source information indicating a source of the first message;
   generating a transaction identifier using private information and the source information indicating the source of the first message, the generated transaction identifier comprising a first aspect and a second aspect;
   sending a second message, in the network protocol connection establishment handshake, to the initiator, the second message comprising the generated transaction identifier;
   receiving a third message, in the network protocol connection establishment handshake, from the initiator, the third message comprising the generated transaction identifier and source information indicating a source of the third message;
   terminating the network protocol connection establishment handshake when the first aspect of the generated transaction identifier does not match a first expectation corresponding to the first aspect, the first expectation being independent of the source information indicating the source of the first message matching the source information indicating the source of the third message;
   establishing a connection with the initiator when the first aspect of the generated transaction identifier matches the first expectation, and the second aspect of the generated transaction identifier matches a second expectation corresponding to the second aspect, the second expectation being dependent on the source information indicating the source of the first message matching the source information indicating the source of the third message; and continuing the network protocol connection establishment handshake to establish the connection when the first aspect of the generated transaction identifier matches the first expectation, but the second aspect of the generated transaction identifier does not match the second expectation.

2. The method of claim 1, wherein receiving the first message comprises receiving the first message indirectly from the initiator through an intermediary.

3. The method of claim 1, wherein continuing the network protocol connection establishment handshake comprises:

generating a new identifier using private information and the source information indicating the source of the third message; and sending a fourth message, comprising the new identifier, to the initiator to cause the initiator to resend the third message using the new identifier.

4. The method of claim 1, wherein generating the transaction identifier comprises:

applying a trapdoor function to first input to create a first data portion;

applying a trapdoor function to second input to create a second data portion, the second input comprising the source information indicating the source of the first message; and combining the first and second data portions into a cookie comprising the transaction identifier.

5. The method of claim 4, wherein the private information comprises a secret key, and applying the trapdoor function to the second input comprises applying a cryptographic hash function to the second input using the secret key, wherein the second input further comprises current time information, and the source of the first message comprises a network address.

6. A non-transitory computer-readable medium encoding a computer program product operable to cause data processing apparatus to perform operations comprising:

receiving a first message, in a network protocol connection establishment handshake, from an initiator, the first message comprising source information indicating a source of the first message;

generating a transaction identifier using private information and the source information indicating the source of the first message, the generated transaction identifier comprising a first aspect and a second aspect;

sending a second message, in the network protocol connection establishment handshake, to the initiator, the second message comprising the generated transaction identifier;

receiving a third message, in the network protocol connection establishment handshake, from the initiator, the third message comprising the generated transaction identifier and source information indicating a source of the third message;

terminating the network protocol connection establishment handshake when the first aspect of the generated transaction identifier does not match a first expectation corresponding to the first aspect, the first expectation being independent of the source information indicating the source of the first message matching the source information indicating the source of the third message;

establishing a connection with the initiator when the first aspect of the generated transaction identifier matches the first expectation, and the second aspect of the generated transaction identifier matches a second expectation corresponding to the second aspect, the second expectation being dependent on the source information indicating the source of the first message matching the source information indicating the source of the third message; and continuing the network protocol connection establishment handshake to establish the connection when the first aspect of the generated transaction identifier matches the first expectation, but the second aspect of the generated transaction identifier does not match the second expectation.

7. The computer-readable medium of claim 6, wherein receiving the first message comprises receiving the first message indirectly from the initiator through an intermediary.

8. The computer-readable medium of claim 6, wherein continuing the network protocol connection establishment handshake comprises:

generating a new identifier using private information and the source information indicating the source of the third message; and sending a fourth message, comprising the new identifier, to the initiator to cause the initiator to resend the third message using the new identifier.

9. The computer-readable medium of claim 6, wherein generating the transaction identifier comprises:

applying a trapdoor function to first input to create a first data portion;

applying a trapdoor function to second input to create a second data portion, the second input comprising the source information indicating the source of the first message; and combining the first and second data portions into a cookie comprising the transaction identifier.

10. The computer-readable medium of claim 9, wherein the private information comprises a secret key, and applying the trapdoor function to the second input comprises applying a cryptographic hash function to the second input using the secret key, wherein the second input further comprises current time information, and the source of the first message comprises a network address.

11. A system comprising:

a first computer operable to send a first message, in a network protocol connection establishment handshake, from an initiator, the first message comprising source information indicating a source of the first message; and one or more additional computers operable to:

receive the first message, in the network protocol connection establishment handshake, generate a transaction identifier using private information and the source information indicating the source of the first message, the generated transaction identifier comprising a first aspect and a second aspect;

send a second message, in the network protocol connection establishment handshake, to the initiator, the second message comprising the generated transaction identifier;

receive a third message, in the network protocol connection establishment handshake, from the initiator, the third message comprising the generated transaction identifier and source information indicating a source of the third message;

terminate the network protocol connection establishment handshake when the first aspect of the generated transaction identifier does not match a first expectation corresponding to the first aspect, the first expectation being independent of the source information indicating the source of the first message matching the source information indicating the source of the third message;

establish a connection with the initiator when the first aspect of the generated transaction identifier matches the first expectation, and the second aspect of the generated transaction identifier matches a second expectation corresponding to the second aspect, the second expectation being dependent on the source information indicating the source of the first message matching the source information indicating the source of the third message; and continue the network protocol connection establishment handshake to establish the connection when the first aspect of the generated transaction identifier matches the first expectation, but the second aspect of the generated transaction identifier does not match the second expectation.

12. The system of claim 11, wherein the one or more additional computers comprise a responder and an intermediary, the intermediary operable to receive the first message and redirect the first message to the responder.

13. The system of claim 11, wherein continuing the network protocol connection establishment handshake comprises:

generating a new identifier using private information and the source information indicating the source of the third message; and sending a fourth message, comprising the new identifier, to the initiator to cause the initiator to resend the third message using the new identifier.

14. The system of claim 11, wherein generating the transaction identifier comprises:

applying a trapdoor function to first input to create a first data portion;

applying a trapdoor function to second input to create a second data portion, the second input comprising the source information indicating the source of the first message; and combining the first and second data portions into a cookie comprising the transaction identifier.

15. The system of claim 14, wherein the private information comprises a secret key, and applying the trapdoor function to the second input comprises applying a cryptographic hash function to the second input using the secret key, wherein the second input further comprises current time information, and the source of the first message comprises a network address.

16. The system of claim 11, wherein the first computer and the one or more computers each comprise a peer in a peer-to-peer network.

* * * * *